United States Patent
Hrubec et al.

(10) Patent No.: US 11,668,372 B2
(45) Date of Patent: Jun. 6, 2023

(54) PLANET-CARRIER FOR AN EPICYCLIC GEARING

(71) Applicant: GE Avio S.r.l., Rivalta di Torino (IT)

(72) Inventors: Juraj Hrubec, Dolny Kubin (SK); Michele Gravina, Minervino Murge (IT); Leonardo Coviello, Bari (IT)

(73) Assignee: GE AVIO S.R.L., Rivalta di Torino (IT)

( * ) Notice: Subject to any disclaimer, the term of this patent is extended or adjusted under 35 U.S.C. 154(b) by 179 days.

(21) Appl. No.: 17/020,262

(22) Filed: Sep. 14, 2020

(65) Prior Publication Data

US 2021/0088114 A1  Mar. 25, 2021

(30) Foreign Application Priority Data

Sep. 20, 2019  (IT) .................. 102019000016892

(51) Int. Cl.
*F16H 1/48* (2006.01)
*F16H 57/08* (2006.01)
*F02C 7/36* (2006.01)

(52) U.S. Cl.
CPC .................. *F16H 1/48* (2013.01); *F02C 7/36* (2013.01); *F16H 57/082* (2013.01)

(58) Field of Classification Search
CPC ............. F16H 57/082; F16H 1/48; F02C 7/36
See application file for complete search history.

(56) References Cited

U.S. PATENT DOCUMENTS

| | | |
|---|---|---|
| 4,901,601 A | 2/1990 | Leggat |
| 5,658,215 A | 8/1997 | Premiski et al. |
| 6,409,414 B1 | 6/2002 | Altamura et al. |
| 8,667,688 B2 | 3/2014 | McCune et al. |
| 8,747,277 B2 | 6/2014 | Ai et al. |
| 9,145,967 B2 | 9/2015 | Fox et al. |
| 9,702,451 B2 | 7/2017 | Gravina |
| 2010/0210407 A1 | 8/2010 | Smook |
| 2010/0296934 A1* | 11/2010 | Warren ................. F16H 1/2836 475/331 |
| 2014/0309078 A1 | 10/2014 | Curti et al. |

(Continued)

FOREIGN PATENT DOCUMENTS

| | | | |
|---|---|---|---|
| DE | 102016204982 A1 * | 9/2017 | ........... F16H 57/082 |
| EP | 1186804 A1 | 3/2002 | |

(Continued)

OTHER PUBLICATIONS

Italian Search Report Corresponding to IT201900016892 dated Mar. 18, 2020.

*Primary Examiner* — Erin D Bishop
(74) *Attorney, Agent, or Firm* — Venable LLP; Elizabeth C. G. Gitlin; Michele V. Frank (57) ABSTRACT

An apparatus and method for reducing planet gear misalignment of planet gears mounted on a planet-carrier in an epicyclic gearing. The apparatus and method of the present disclosure specifically provide for a stiffness-reducing feature, a pillar, and a side-plate, each with a respective stiffness. In several embodiments, the feature stiffness is less than the pillar stiffness which is at least 10% less than the side-plate stiffness. The stiffness-reducing feature and the pillar may make up a pylon which has an axis. The pylon axis may form an angle with the side plate which is less than 90° and greater than 20°.

17 Claims, 7 Drawing Sheets

(56) References Cited

U.S. PATENT DOCUMENTS

| | | |
|---|---|---|
| 2016/0201794 A1 | 7/2016 | Gravina |
| 2017/0335946 A1 | 11/2017 | Muldoon |
| 2018/0031039 A1 | 2/2018 | Nonato de Paula et al. |
| 2018/0306283 A1 | 10/2018 | Engesather et al. |

FOREIGN PATENT DOCUMENTS

| | | |
|---|---|---|
| EP | 2210017 A1 | 7/2010 |
| EP | 2256343 A2 | 12/2010 |
| EP | 2998615 A2 | 3/2016 |
| FR | 3076336 A1 | 7/2019 |
| WO | WO2013065024 A1 | 5/2013 |

* cited by examiner

PLANET-CARRIER FOR AN EPICYCLIC GEARING

The project leading to this application has received funding from the Clean Sky 2 Joint Undertaking under the European Union's Horizon 2020 research and innovation program under grant agreement No. 807085-ENG GAM 2018-H2020-IBA-CS2-GAMS-2017/H2020-IBA-CS2-GAMS-2017

PRIORITY

The present application claims priority to Italian Patent Application No. 102019000016892 filed on Sep. 20, 2019.

FIELD

The present subject matter relates generally to a planet-carrier for an epicyclic gearing, in particular for aeronautic applications, to which the following description refers, but without any loss of generality.

BACKGROUND

Epicyclic gearing is a widely used in the field of aeronautic engines for transmitting drive and converting power between a turbine engine and a propulsive element, such as a fan. The use of a gearbox with an epicyclic gearing arrangement allows the fan to be rotated at fewer revolutions per unit of time than the rotational speed of the low-pressure shaft of the engine, for greater efficiency. The gearbox rotatably supports a sun gear that is disposed centrally with respect to a ring gear and a plurality of planet gears mounted on a planet-carrier, which are disposed around the sun gear and engage between the sun gear and the ring gear. The low-pressure shaft provides the input to the epicyclic gearing arrangement being coupled to the sun gear, while the fan is coupled to rotate in unison with the planet-carrier. Each planet gear meshes with the sun gear and with the ring gear, which is held stationary. The shaft of the fan is rotatable on its own bearing that is housed in a sun gear box, which is also called the fan gearbox that is fixed to the rotationally central region of a carrier. Each planet gear is rotatable on a bearing mounted on a planet pin, which is fixed to the peripheral region of the carrier.

For any given gas turbine engine application, the planet gears are designed to provide a set reduction ratio between the rotational speed of the low-pressure shaft and the rotational speed of the fan shaft. Because each epicyclic gearbox that houses the planet gears is disposed within the flow path of the gas turbine engine, the challenge is to design, on the one hand, a reliable and robust epicyclic gearbox that meets all flight conditions of the engine while, on the other hand, designing a epicyclic gearbox that is compact sufficiently to fit inside the flow path in a way that does not require the entire engine size to be larger and heavier than otherwise would be needed in order to accommodate the epicyclic gearbox.

An additional challenge lies with the torque extraction. It is known that torque extraction may cause a high load sharing factor between two rows, or arrays, of gears. This factor may, in turn, subject the planet pin to unequal displacements. A known way to counteract this misalignment is to increase the size of the components of the epicyclic gearing. Such an increase in component size may not be desirable in all applications due to the limitations discussed above. One design trade-off may be to limit the number of gears, for example to three pairs of gears, so as to leave sufficient space to reinforce the planet-carrier. However, in some applications, it may be desirable to employ a high number of planet gears, for example five to nine pairs of gears. Such a high number of planet gears significantly limits the space available for planet-carrier reinforcement.

Accordingly, an apparatus and method for reducing the misalignment of planet gears mounted on a planet-carrier, would be beneficial.

BRIEF DESCRIPTION

Aspects and advantages of the invention will be set forth in part in the following description, or may be obvious from the description, or may be learned through practice of the invention.

In accordance with one embodiment of the present disclosure, a planet-carrier for an epicyclic gearing defining a transmission axis is provided. The carrier may include a side plate. The side plate may include a coupling portion for connecting the side plate to a rotating member or to a static structure. The carrier may include a central ring coaxial to the side plate along the transmission axis. A plurality of planet pins may be coupled to the central ring. The carrier may also include a plurality of support pylons, which may include a first support pylon. The first support pylon may have a first pylon end coupled to the side plate and a second pylon end coupled to the central ring. The first support pylon may include a pillar defining a pillar stiffness and a stiffness-reducing feature defining a feature stiffness. The stiffness-reducing feature and the pillar may be arranged along the first support pylon. The feature stiffness may be less than the pillar stiffness.

In accordance with another embodiment of the present disclosure, a gas turbine engine is provided. The gas turbine engine may include an epicyclic gearing having a planet-carrier. The carrier may include a side plate. The side plate may include a coupling portion for connecting the side plate to a rotating member or to a static structure. The carrier may include a central ring coaxial to the side plate along the transmission axis. A plurality of planet pins may be coupled to the central ring. The plurality of planet pins may protrude in opposite directions from the central ring along respective axes, parallel and eccentric with respect to the transmission axis. Each of the planet pins may be configured to carry respective planet gears. The plurality of planet pins may include more than three and less than or equal to nine pairs of planet pins configured to carry more than three and less than or equal to nine pairs of planet gears. The carrier may also include a plurality of support pylons, which may include a first support pylon. The first support pylon may have a first pylon end coupled to the side plate and a second pylon end coupled to the central ring. The first support pylon may include a pillar defining a pillar stiffness and a stiffness-reducing feature defining a feature stiffness. The stiffness-reducing feature and the pillar may be arranged along the first support pylon. The feature stiffness may be less than the pillar stiffness.

In accordance with another embodiment of the present disclosure a method for reducing the misalignment of planet gears mounted on a planet-carrier in an epicyclic gearing is provided. The carrier may include a side plate, a central ring, a plurality of planet pins, and a plurality of support pylons. The support pylons may include a pillar and a stiffness-reducing feature. The method may include determining a feature stiffness for the stiffness-reducing feature. The method may include determining a pillar stiffness for the pillar. The pillar stiffness may be greater than the feature stiffness. The method may also include determining a side-plate stiffness for the side plate. The side-plate stiffness is 10% greater than the pillar stiffness, which is greater than the feature stiffness. Additionally, the method may include establishing an angle between a pylon axis and the side plate which is less than 90° and greater than 20°.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

An apparatus and method are generally provided for reducing the misalignment of planet gears, mounted on a planet-carrier in an epicyclic gearing, during torque extraction. The planet-carrier and method of the present disclosure specifically provide for a carrier, which includes a side plate, a central ring, and a plurality of planet pins for supporting a plurality of planet gears. The central ring may be coupled to the side plate by a plurality, or array, of support pylons. Each of the support pylons may include a pillar and a stiffness-reducing feature. The pillar may define a pillar stiffness and the stiffness-reducing feature may define a feature stiffness. Similarly, the side plate may define a side-plate stiffness. The side-plate stiffness may be significantly greater than the pillar stiffness. Thus, the side-plate stiffness may be significantly greater than the pillar stiffness, which is, in turn, greater than the feature stiffness. Additionally, each of the support pylons may form an angle with the side plate which is less than 90°.

Forming a planet-carrier with the above features, may ensure that the load sharing factor between the two rows of gears will be the smallest possible. To accomplish this, the plurality of support pylons may be oriented so as to form trapezoidal shapes with the side plate and the central ring and may be formed with a plurality of stiffness-reducing features. With the planet-carrier in such a configuration, under load, a planet pin may be deformed in such a manner wherein both sides of the pin have the similar displacement, which translates to an equal load share between both sides of the pin and their respective planet gears. Thus, a linear behavior of the structure, regardless of the amount of load, may be ensured.

One of ordinary skill in the art should appreciate that ensuring the linear behavior of the structure will optimize the load sharing factor between two rows of gears. This, in turn, may reduce the requirement to oversize the gears, bearings, or support structure. As a result, it may be possible to increase the number of planet gears which may be fitted into a gearbox of a given size or reduce the size of a gearbox while retaining the ability to handle a certain load.

Figure 1:
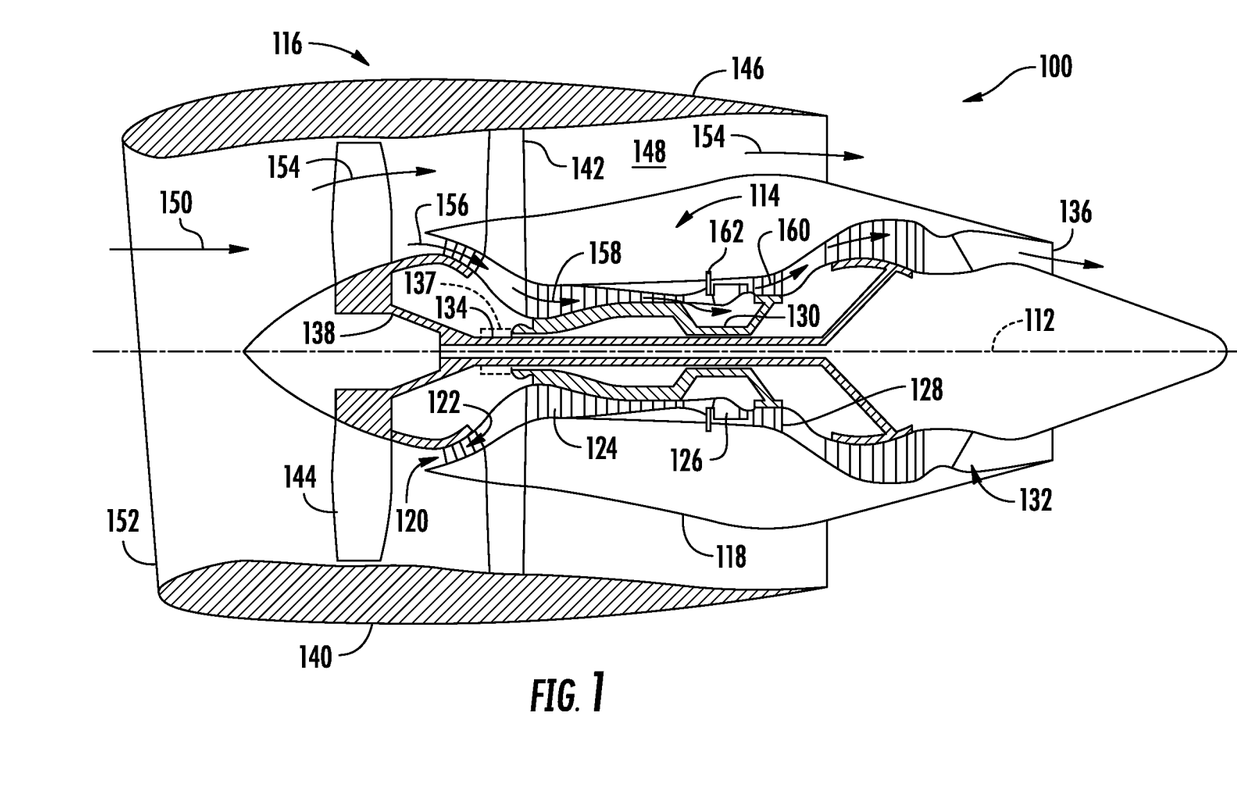
FIG. 1 illustrates a schematic cross-sectional view of an exemplary gas turbine engine according to various embodiments of the present subject matter.

Referring now to the drawings, FIG. 1 illustrates a cross-sectional view of one embodiment of a gas turbine engine 100 that may be utilized with an aircraft in accordance with aspects of the present subject matter, with the engine 100 being shown having a longitudinal or axial centerline axis 112 extending therethrough for reference purposes. The engine 100 will be discussed in detail below. Although shown as a turbofan jet engine, any suitable turbomachine can be utilized with the systems described herein. For example, suitable turbomachines include, but are not limited to, high-bypass turbofan engines, low-bypass turbofan engines, turbojet engines, turboprop engines, turboshaft engines, propfan engines, and so forth.

Figure 2:
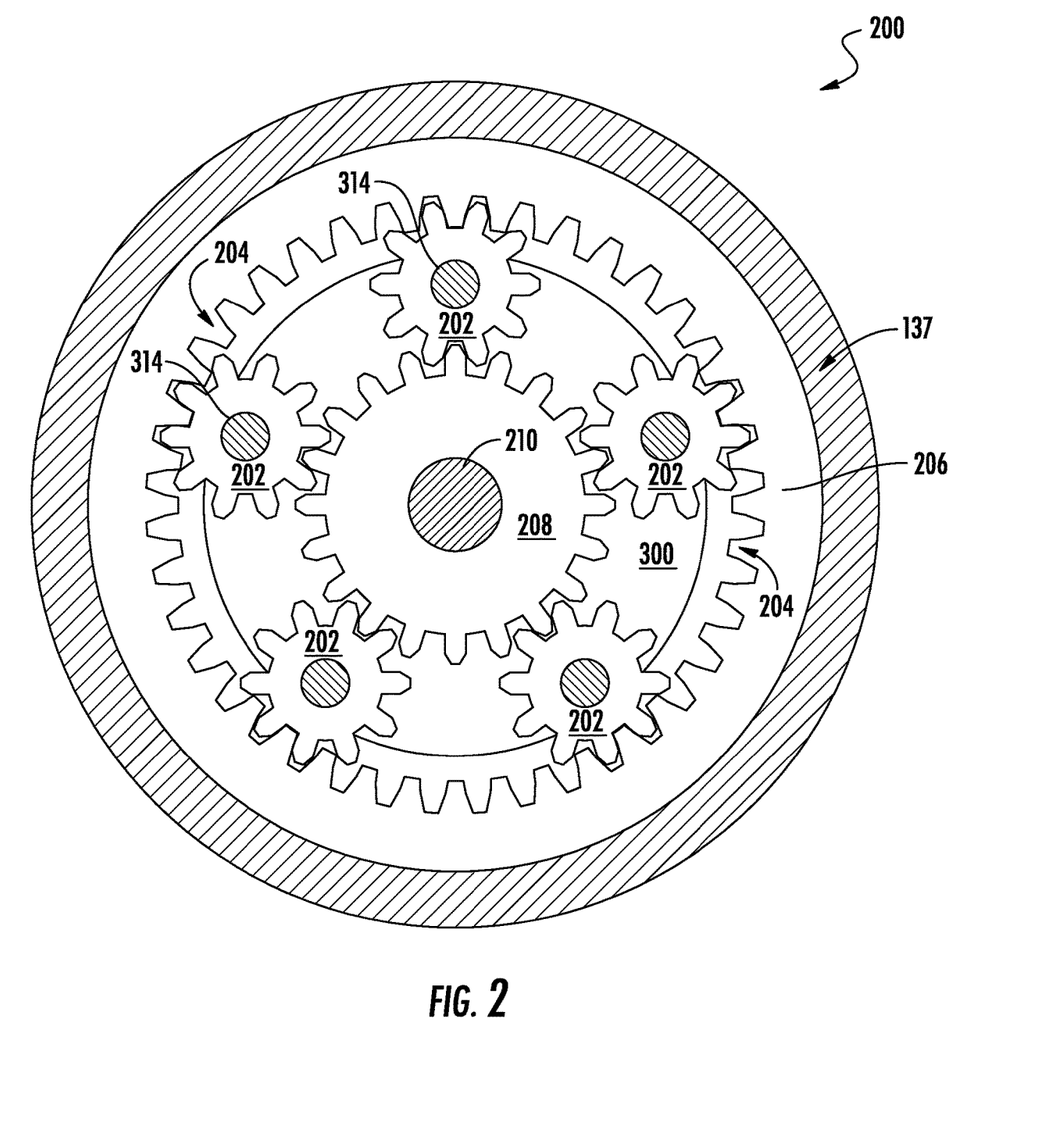
FIG. 2 illustrates a simplified view of an epicyclic gearing, such as for use in the exemplary gas turbine engine of FIG. 1 according to the present disclosure.
Figure 3:
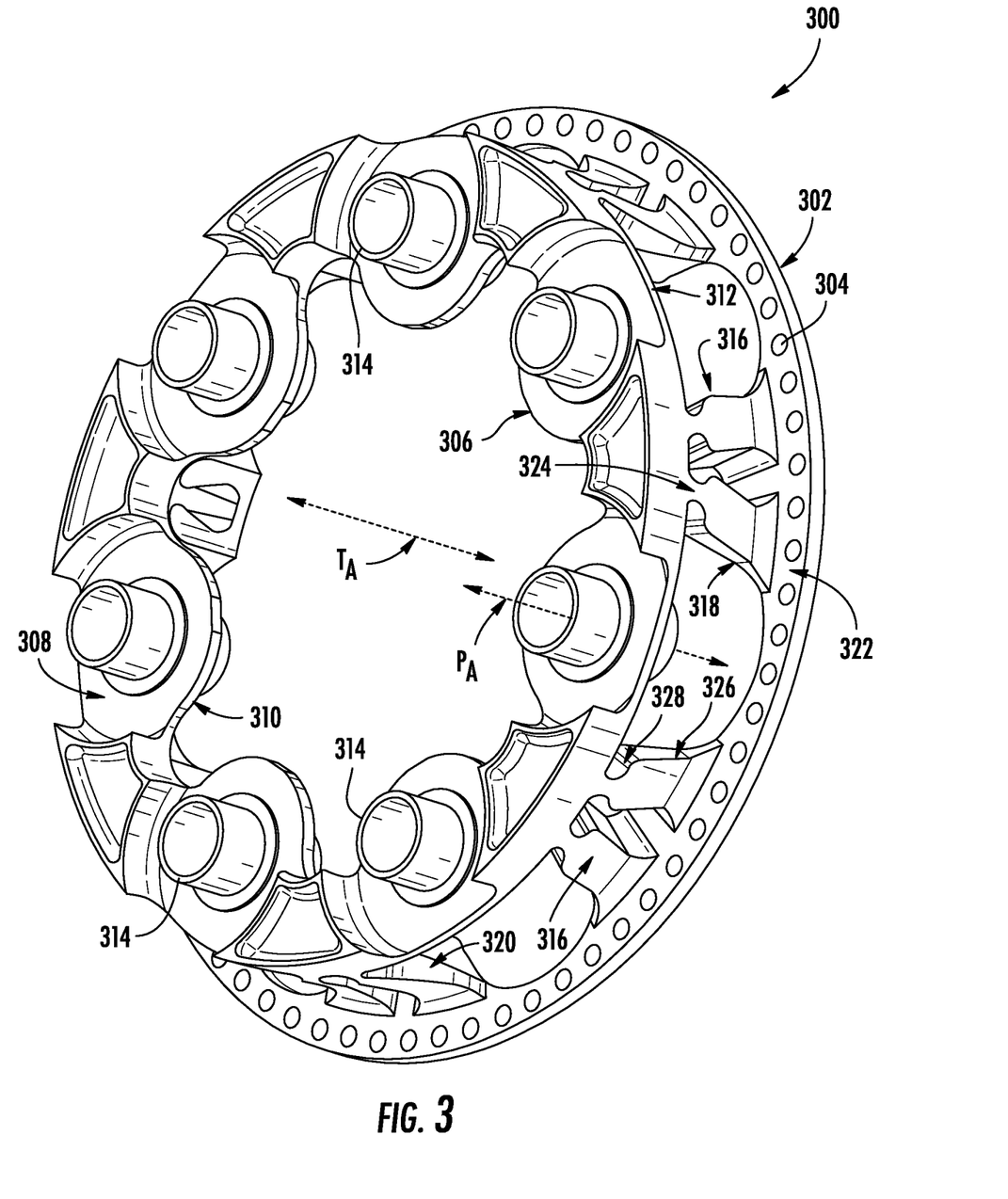
FIG. 3 shows a perspective view of a planet-carrier 4 and epicyclic gearing, such as is illustrated in FIG. 2 according to the present disclosure.

FIG. 2 illustrates a simplified view of an exemplary epicyclic gearing 200. The exemplary epicyclic gearing 200 may be employed in applications wherein a relatively high torque capability is required from a gear train having a reduced volume. For example, the epicyclic gearing 200 may be employed in the gas turbine engine 100 to transfer a torque load from a low-pressure drive shaft 134 to a fan rotor 138. As depicted in FIG. 2, the epicyclic gearing 200 may include a plurality of planet gears 202 which are arranged about a transmission axis (FIG. 3, $T_A$). Each of the planet gears 202 rotate about respective planet axes (FIG. 3, $P_A$). The plurality of planet gears 202 are supported by a planet-carrier (carrier) 300. In at least one embodiment, the plurality of planet gears 202 may form two arrays, which are symmetrical with respect to a plane (FIG. 6, 330) (orthogonal to the transmission axis $T_A$), such that a portion of the planet-carrier 300 also lies on the orthogonal plane 330 and is disposed between the two arrays of planet gears. The plurality of planet gears 202 mesh outwardly with the inner toothings 204 of a ring gear 206. The plurality of planet gears 202 also mesh inwardly with at least one sun gear 208. The sun gear 208 is coaxial and fixed with respect to a shaft 210. In at least one embodiment, the shaft 210 may correspond to the low-pressure drive shaft 134 of a gas turbine engine.

Figure 6:
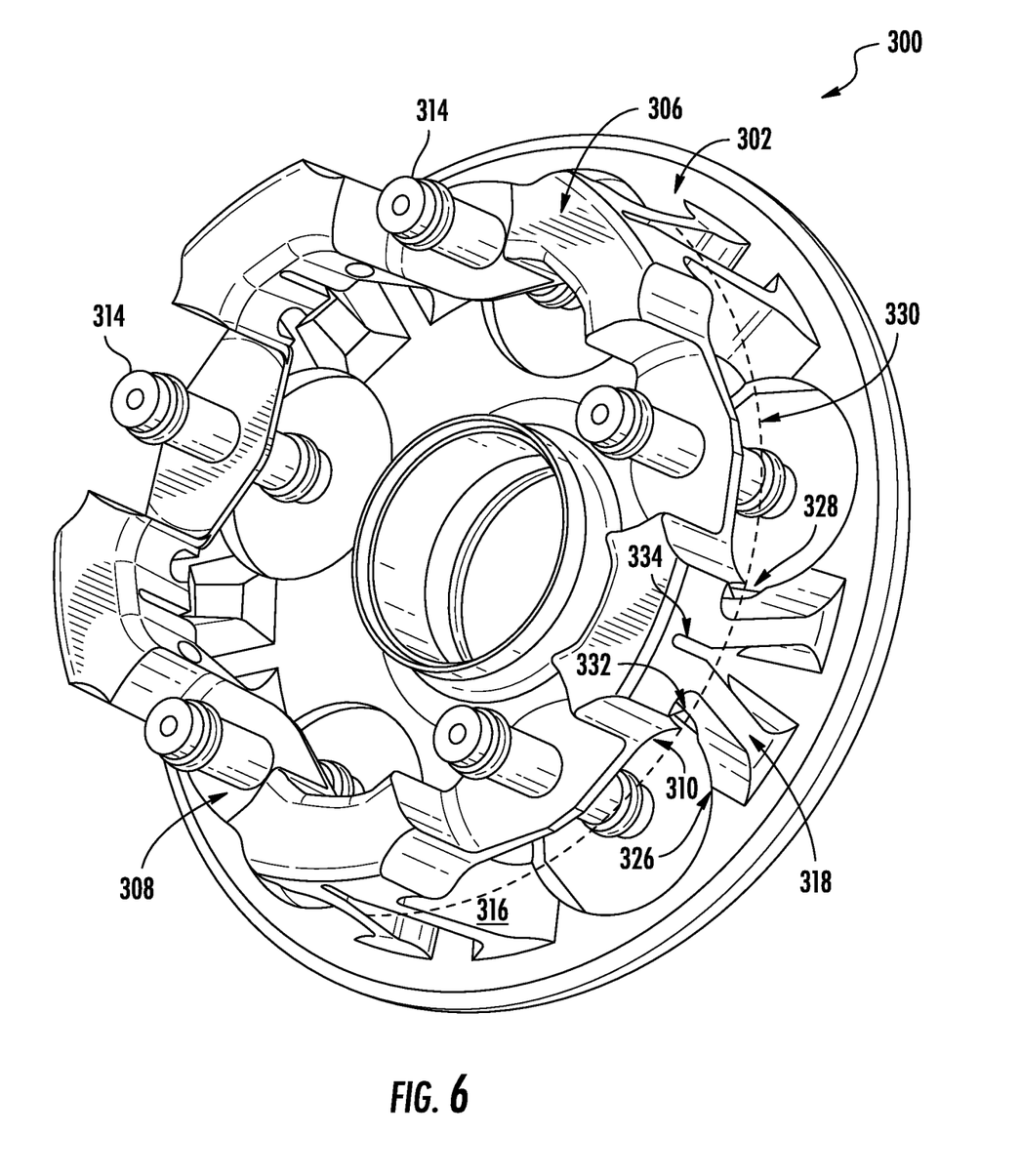
FIG. 6 shows a perspective view of a planet-carrier for an epicyclic gearing in accordance with an embodiment of the present disclosure particularly illustrating a planet-carrier configured to support five pairs of planet gears according to the present disclosure.
Figure 7:
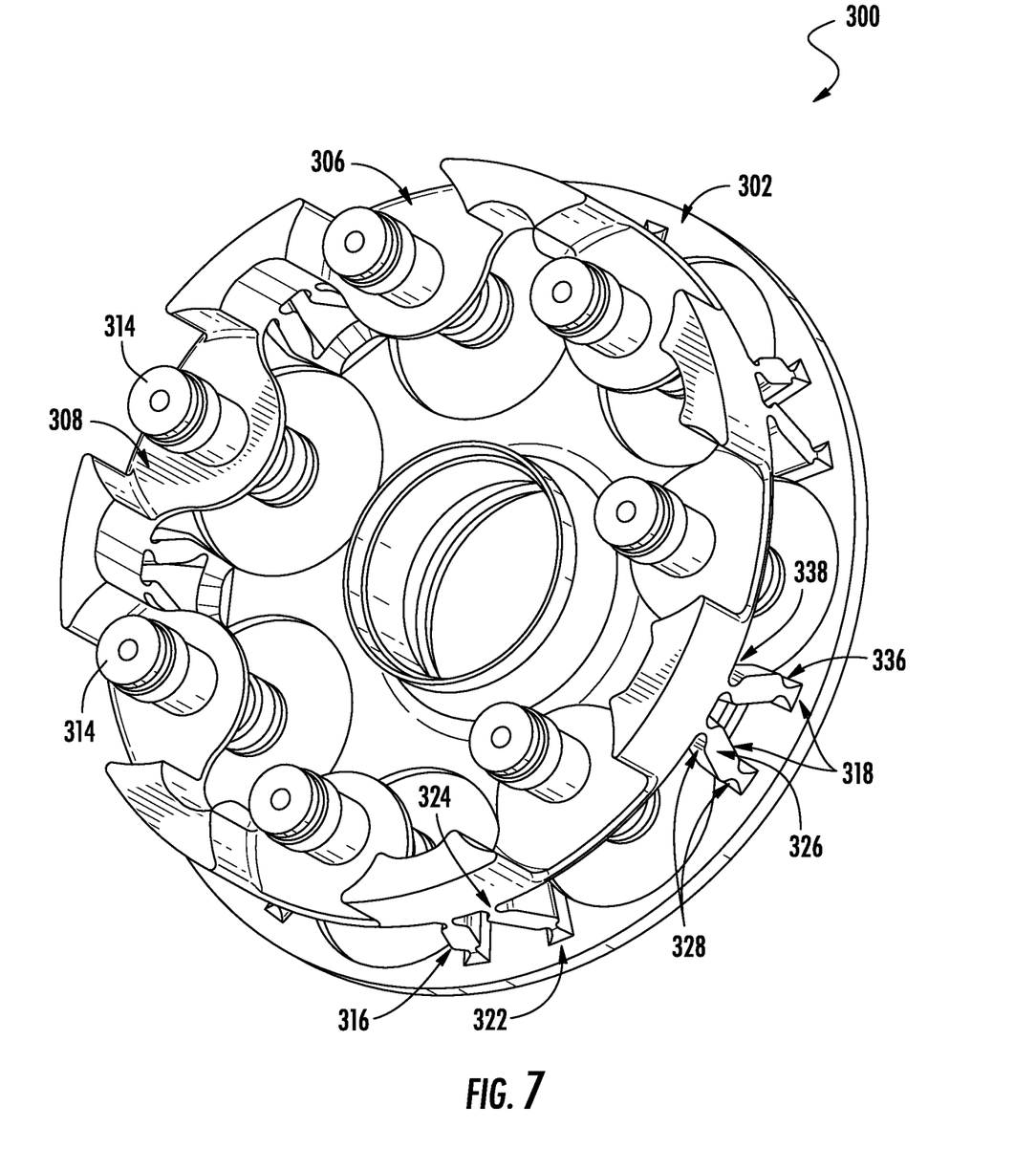
FIG. 7 shows a perspective view of an embodiment in accordance with the present disclosure particularly illustrating a support pylon configuration.

FIGS. 3, 6, and 7 show a perspective views of various embodiments of the carrier 300 for the epicyclic gearing 200 in accordance with an embodiment of the present disclosure. The carrier 300 may be a monolithic or unitary body (i.e. a body made in a single piece) and may comprise an annular structure. The carrier 300 may, in certain embodiments, include a side plate 302. The side plate 302 may include a coupling portion 304 for connecting the side plate 302 to a rotating member or to a static structure. For example, the side plate 302 may be coupled to a shaft which drives the fan of a turbofan engine. The coupling portion 304 may be a flange designed to be fastened by screws or bolts to the rotating member or to the static structure. Alternatively, the coupling portion 304 may be defined by a hole spline or a shaft spline. The side plate 302 may also define a side-plate stiffness. The side-plate stiffness may be determined by a number of structural, material, and manufacturing considerations. In other words, the side-plate stiffness may be determined by any combination of the material used to make the component, the dimensions of the side plate 302, and the methods employed to manufacture the side plate 302. In at least one embodiment, the side plate 302 may be a single segment formed integrally without any seams or joints.

The carrier 300 may also include a central ring 306 coaxial with the side plate 302 along the transmission axis $T_A$. At least a portion of the central ring 306 may lie on the plane 330 orthogonal to the transmission axis $T_A$ and may be disposed between the two arrays of planet gears. The central ring 306 may include a first face 308 and a second face 310 opposite thereof. A central-ring thickness 312 may be defined between the first face 308 and the second face 310. The second face 310 may be oriented toward the side plate 302 and may define a plane 330. In at least one embodiment, the central ring 306 may be a single segment formed integrally without any seams or joints. In other words, the central ring may define a circumference which is unbroken, having neither a plurality of independent segments nor a plurality of stress relieving features.

Still referring to FIGS. 3, 6, and 7, the carrier 300 may include a plurality of planet pins 314 coupled to the central ring 306. The plurality of planet pins 314 may protrude in opposite directions from the central ring 306 along respective axes, parallel and eccentric with respect to the transmission axis $T_A$. Each of the planet pins 314 may be configured to carry a respective planet gear 202. The planet pins 314 may be formed in one piece with the central ring 306 so that the plurality of planet pins 314 form an integral part of the carrier 300. As the plurality of planet pins 314 may protrude in opposite directions from the central ring 306, the central ring 306 may provide cantilever support to each of the planet pins 314 and the respective planet gears 202. In other words, a single central ring 306 may support pairs of coaxial planet pins 314 at respective interfaces on the first face 308 and the second face 310. This configuration, wherein the support to the planet pin 314, may exist only at one end of the planet pin 314, may be contrasted with other known carrier 300 configurations wherein support may be provided at both ends of a planet pin 314.

In at least one embodiment, such as is depicted by FIG. 6, the plurality of planet pins 314 comprise five pairs of planet pins 314 configured to carry five pairs of planet gears 202. In such an embodiment, the five pairs of planet gears 202 may form a first array of five planet gears 202 adjacent to the first face 308 of the central ring 306 and a second array of five planet gears 202 adjacent to the second face 310 of the central ring 306. In an additional embodiment, such as is depicted by FIGS. 3 and 7, the plurality of planet pins 314 may comprise seven pairs of planet pins 314 configured to carry seven pairs of planet gears 202 in such an embodiment, the seven pairs of planet gears 202 may form a first array of seven planet gears 202 adjacent to the first face 308 of the central ring 306 and a second array of seven planet gears 202 adjacent to the second face 310 of the central ring 306. In yet further embodiments in accordance with the present disclosure, the plurality of planet pins 314 may include more than three and less than or equal to nine pairs of planet pins configured to carry more than three and less than or equal to nine pairs of planet gears.

Referring now to FIGS. 3-7, the carrier 300 may include a plurality of support pylons 316. The plurality of support pylons 316 may include a first support pylon 318 and, in some embodiments, a second support pylon 320. The first support pylon 318 may have a first pylon end 322 coupled to the side plate 302 and a second pylon end 324 coupled to the central ring 306. The first support pylon 318 may also define a pylon axis $S_A$ passing through the first pylon end 322 and the second pylon end 324. The pylon axis $S_A$ may form an angle α with the side plate 302 which is less than 90° and greater than 20°. The requirement that the angle α be less than 90° may be based in part on experimentation. It has been shown that when the plurality of support pylons 316 are substantially parallel (e.g., having an angle α of 90°) to the axis of the gearing (e.g., the transmission axis $T_A$), localized bending moments are transferred through the plurality of support pylons 316 to the central ring 306. The bending moments lead to the bending of the central ring 306 and the misalignment of the planet pins 314. Additionally, the requirement that the angle α the greater than 30° may be based in part on the available spaces between the planet gears. It should be appreciated that, as the number of planet gears increases, the amount of free space within a gearbox 137 of a given volume decreases. As such, in at least one embodiment, the angle α may be less than or equal to 85°. The angle α may be greater than or equal to 75°. In yet another embodiment, the angle α may be less than 75°. The angle α may be greater than or equal to 60°.

Still referring to FIGS. 3-7, the first support pylon 318 may also include a pillar 326 and a stiffness-reducing feature 328. The pillar 326 may define a pillar stiffness which is at least 10% less than the side-plate stiffness. The stiffness-reducing feature 328 may define a feature stiffness. The feature stiffness may be less than the pillar stiffness so that the side-plate stiffness is at least 10% greater than the pillar stiffness which, in turn, is greater than the side-plate stiffness. The stiffness-reducing feature 328 and the pillar 326 may be arranged along the first support pylon 318. For example, in one exemplary embodiment, the stiffness-reducing feature 328 may be joined to, or formed integrally with, an end of the pillar 326 and the combined stiffness-reducing feature 328 and first support pylon 318 may be coaxial with the pylon axis $S_A$.

It should be appreciated that the stiffness-reducing feature 328 may have any or all of a differing geometry, material composition, or structure than the pillar 326. For example, the stiffness-reducing feature 328 may, in at least one embodiment, have a lattice structure which enables deformation in a predictable manner. In another exemplary embodiment, the pillar 326 may be formed from a first material having a first stiffness attribute, while the stiffness-reducing feature 328 may be formed from a second material having a second stiffness attribute which is less than the first stiffness attribute of the first material. In yet another exemplary embodiment, the pillar 326 may define a pyramidal shape which contributes to the pillar stiffness, while the stiffness-reducing feature 328 may define a cylindrical shape which contributes to the feature stiffness being less than the pillar stiffness.

Figure 4:
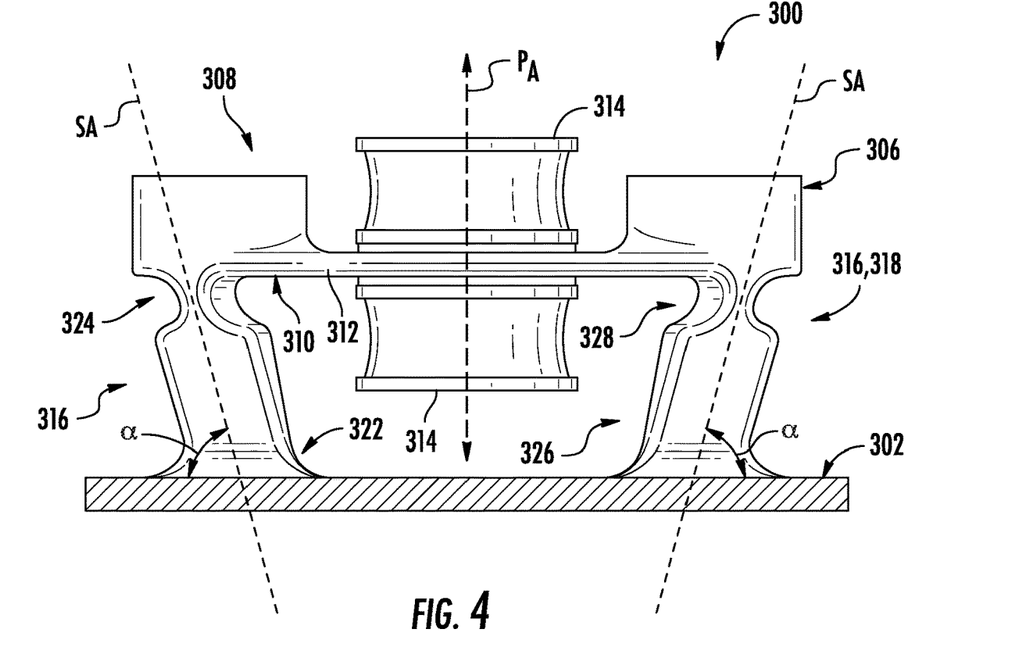
FIG. 4 depicts a cross-section view of the planet-carrier of FIG. 3 particularly illustrating support pylons having a pillar and a stiffness-reducing feature according to the present disclosure.

FIG. 4 depicts a cross-section view of the planet-carrier 300 of FIG. 3 particularly illustrating the first support pylon 318 having a pillar 326 and a stiffness-reducing feature 328. As particularly illustrated in FIGS. 3 and 4, in at least one embodiment, the pillar 326 may have a minimum pillar cross-sectional area and the stiffness-reducing feature 328 may have a minimum feature cross-sectional area. The minimum feature cross-sectional area may be less than the minimum pillar cross-sectional area. For example, in the embodiment depicted in FIG. 4, the pillar 326 may be formed with a pillar thickness while the stiffness-reducing feature 328 may be formed with a pair of undercuts, which define a minimum feature thickness that is less than a minimum pillar thickness. In an alternative example, a single undercut may define a stiffness-reducing feature 328 that is not coaxial with the pillar 326 yet retains the attributes of having a feature thickness which is less than the minimum pillar thickness. In yet another example, the stiffness-reducing feature 328 and the pillar 326 may be coaxial and may be circular in profile. In such an example, the pillar 326 may have a minimum radius that is greater than a minimum radius of the stiffness-reducing feature 328. It should be appreciated that, as stated previously, the inclusion of the stiffness-reducing feature 328 in the first support pylon 318 may facilitate the stiffness-reducing feature 328 having a stiffness which is less than the pillar stiffness.

Figure 5:
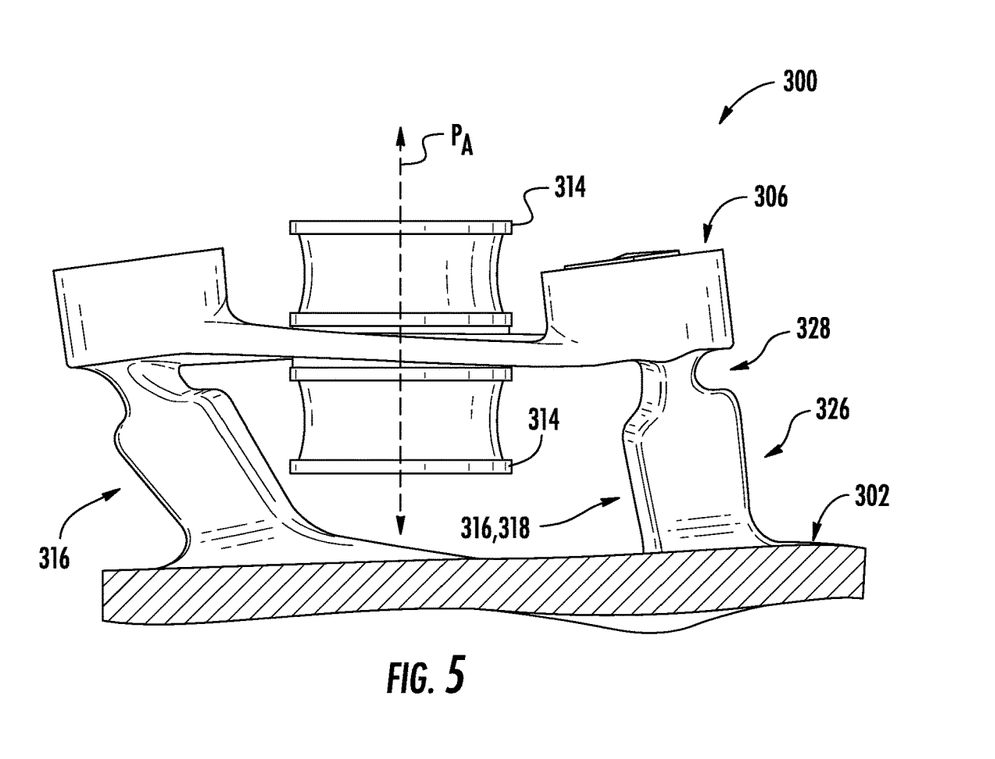
FIG. 5 depicts a cross-section view of the planet-carrier of FIG. 3 particularly illustrating a deformation of the planet-carrier under load according to the present disclosure.

Still referring to FIGS. 3 and 4, and also to FIG. 5, which particularly illustrates the deformation of the planet-carrier 300 depicted in FIG. 4 under load. The portion of the carrier 300 depicted in FIG. 5 may be formed so that the side plate 302 has a side-plate stiffness which is significantly (e.g. 10% to 150%) greater than the stiffness of the pillar 326 and the pillar stiffness is greater (e.g. 5% to 100%) than the stiffness of the stiffness-reducing feature 328. As depicted in FIG. 4, the pylon axis $S_A$ may form an angle α with the side plate 302 which is less than 90° and greater than 20°. Upon application of a load during torque extraction, the carrier 300, being configured in accordance with the present disclosure, may deform in the manner depicted in FIG. 5. As is depicted, the combination of the stiffness relationship between the side plate, pillar, and stiffness-reducing feature and the angle α enables the carrier 300 to deform in such a manner that the planet gear misalignment (as represented by the planet axis $P_A$) is minimized. In other words, the particular structural relationship taught herein enables the planet axis $P_A$ to remain substantially parallel to the transmission axis $T_A$ when the carrier 300 is under load, such as during operation of a jet turbine engine.

It should be appreciated that, in at least one embodiment, the stiffness relationship between the side plate, pillar, and stiffness-reducing feature may be enhanced by the addition of a plurality of stiffening elements. In such an embodiment, the carrier 300 may include a plurality of stiffening elements coupled to at least one of the side plate, the central ring, and the pillar, such that the resultant side-plate stiffness is significantly greater than the resultant pillar stiffness, which is greater than the feature stiffness. For example, in order to increase the pillar stiffness, additional stiffening elements, or reinforcing features, may be coupled to the pillar 326. Such a stiffening element may, for example, include a reinforcing material (e.g. a composite) that is different than a pillar material. Alternatively, the stiffening elements may provide additional material which is the same as the pillar material, wherein the additional material modifies the structural geometry of the pillar 326 to increase pillar stiffness.

Referring again to FIG. 6, a perspective view of the carrier 300 for the epicyclic gearing 200 in accordance with an embodiment of the present disclosure is presented. FIG. 6 depicts the carrier 300 configured to support five pairs of planet gears 202 on five pairs of planet pins 314, though it should be appreciated that the particular embodiments depicted in FIG. 6 is not limited to supporting five pairs of planet gears 202. As depicted in FIG. 6, the central ring may include the first face 308 and the second face 310 opposite thereof. The second face 310 may be oriented toward the side plate 302 and may define a plane 330. The first support pylon 318 may extend past the plane 330 to at least partially define a recess 332 in the second face 310. In an additional exemplary embodiment, the recess 332 may be a first recess and the first support pylon 318 may partially define a second recess 334 in the second face 310. The recesses 332, 334 may be of substantially the same size and configuration and may resemble a pair of arches wherein the first support pylon 318 is the central support. Alternatively, the recesses 332, 334 may be configured with differing geometries.

FIG. 7 shows a perspective view of an embodiment in accordance with the present disclosure particularly illustrating a support pylon configuration. In particular, as depicted in FIG. 7, the first support pylon 318 may include a first stiffness-reducing feature 336 and a second stiffness-reducing feature 338. The first and second stiffness-reducing features 336, 338 may be positioned at the first and second pylon support ends 322, 324 respectively. In other words, the first stiffness-reducing feature 336 may be located at the first pylon end 322 and the second stiffness-reducing feature 338 may be located at the second pylon end 324. The first stiffness-reducing feature 336 may have a first feature cross-sectional area and the second stiffness-reducing feature 338 may have a second feature cross-sectional area. The first feature cross-sectional area and the second feature cross-sectional area may be less than a minimum cross-section area of the pillar 326. In at least one embodiment, the pillar 326, the first stiffness-reducing feature 336, and the second stiffness-reducing feature 338 may be arranged so that they are non-coaxial with the first support pylon 318 and non-coaxial with one another. Alternatively, the pillar 326 may be coaxial with the first support pylon 318, while the first and second stiffness-reducing features 336, 338 may be non-coaxial with the first support pylon 318 and with each other. In yet another embodiment, the pillar 326 and the first and second stiffness-reducing features 336, 338 may be coaxial with the first support pylon 318.

It should be appreciated that the various configurations of the pillar 326 and the stiffness-reducing feature 328 discussed herein may be combined. For example, the elements of the configuration of the first support pylon 318 as described with regards to FIG. 6, may be combined with elements of the first support pylon 318 at described with regards to FIG. 7. Such a combination may also include elements of the stiffness-reducing feature 328 and the pillar 326 as discussed with regards to FIG. 4. In such a non-limiting example, the second pylon support end 324 may extend past the plane 330 to at least partially define a recess 332 in the second face 310. In the same exemplary embodiment, the first pylon end 322 may be configured with a single undercut, which may result in a stiffness-reducing feature 328 which is not coaxial with the pillar 326 yet retains the attributes of having a feature thickness which is less than the minimum pillar thickness.

Figure 8:
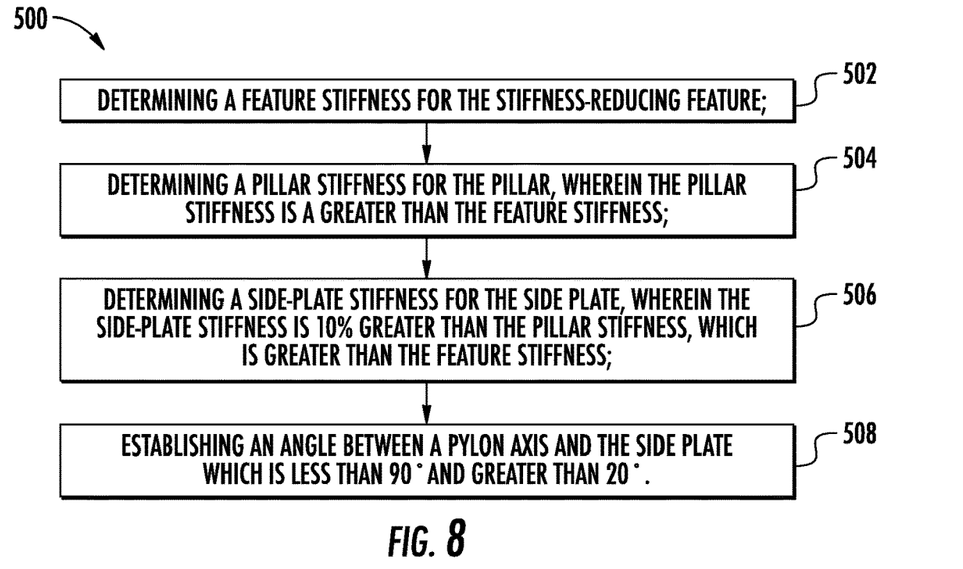
FIG. 8 provides a flow diagram of a method for reducing the misalignment of planet gears mounted on a planet-carrier in an epicyclic gearing, such as is illustrated in FIG. 2 according to the present disclosure.

Referring now to FIG. 8, a flow diagram of a method 500 for reducing the misalignment of planet gears mounted on a planet-carrier in an epicyclic gearing, such as is illustrated in FIG. is presented. In general, the method 500 will be described herein with reference to the carrier 300 shown in FIGS. 2-7. The planet-carrier may include a side plate, a central ring, a plurality of planet pins, and a plurality of support pylons. The plurality of support pylons may include a pillar and a stiffness-reducing feature. Although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and-or adapted in various ways without deviating from the scope of the present disclosure.

As shown in FIG. 8, the exemplary method 500 includes at 502, determining a feature stiffness for each of the plurality of stiffness-reducing features. The exemplary method 500 includes at 504, determining a pillar stiffness for each of the pillars. The pillar stiffness may be greater than the feature stiffness. The method 500 may include at 506, determining a side-plate stiffness for the side plate. The side-plate stiffness may be at least 10% greater than the pillar stiffness, which may be greater than the feature stiffness. The exemplary method 500 includes at 508, establishing an angle between a pylon axis and the side plate which is less than 90° and greater than 20°. It should be appreciated that any, or all, of the above steps of the exemplary method 500 may be accomplished with a computing device, with the result of the method being the production of a model of a unitary planet-carrier in accordance with the rules set forth above. Alternatively, it should be appreciated that the exemplary method 500 may equally apply to a manufacturing process resulting in the forming of a planet-carrier conforming to the rules set forth above.

Referring again to FIG. 1, in general, the engine 100 may include a core gas turbine engine (indicated generally by reference character 114) and a fan section 116 positioned upstream thereof. The core engine 114 may generally include a substantially tubular outer casing 118 that defines an annular inlet 120. In addition, the outer casing 118 may further enclose and support a booster compressor 122 for increasing the pressure of the air that enters the core engine 114 to a first pressure level. A high-pressure, multi-stage, axial-flow compressor 124 may then receive the pressurized air from the booster compressor 122 and further increase the pressure of such air. The pressurized air exiting the high-pressure compressor 124 may then flow to a combustor 126 within which fuel is injected by a fuel system 162 into the flow of pressurized air, with the resulting mixture being combusted within the combustor 126. The high energy combustion products are directed from the combustor 126 along the hot gas path of the engine 100 to a first (high-pressure, HP) turbine 128 for driving the high-pressure compressor 124 via a first (high-pressure, HP) drive shaft 130, and then to a second (low-pressure, LP) turbine 132 for driving the booster compressor 122 and fan section 116 via a second (low-pressure, LP) drive shaft 134 that is generally coaxial with first drive shaft 130. After driving each of turbines 128 and 132, the combustion products may be expelled from the core engine 114 via an exhaust nozzle 136 to provide propulsive jet thrust.

It should be appreciated that each turbine 128, 130 may generally include one or more turbine stages, with each stage including a turbine nozzle and a downstream turbine rotor. As will be described below, the turbine nozzle may include a plurality of vanes disposed in an annular array about the centerline axis 112 of the engine 100 for turning or otherwise directing the flow of combustion products through the turbine stage towards a corresponding annular array of rotor blades forming part of the turbine rotor. As is generally understood, the rotor blades may be coupled to a rotor disk of the turbine rotor, which is, in turn, rotationally coupled to the turbine's drive shaft (e.g., drive shaft 130 or 134).

Additionally, as shown in FIG. 1, the fan section 116 of the engine 100 may generally include a rotatable, axial-flow fan rotor 138 that configured to be surrounded by an annular fan casing 140. In particular embodiments, the (LP) drive shaft 134 may be connected directly to the fan rotor 138 such as in a direct-drive configuration. In alternative configurations, the (LP) drive shaft 134 may be connected to the fan rotor 138 via a gearbox 137, which may have an epicyclic gearing 200 in an indirect-drive or geared-drive configuration. Such speed reduction devices may be included between any suitable shafts/spools within engine 100 as desired or required. It should be appreciated that the gearbox 137 may be located at any suitable location within the engine 100, to include the LP turbine 132.

It should be appreciated by those of ordinary skill in the art that the fan casing 140 may be configured to be supported relative to the core engine 114 by a plurality of substantially radially-extending, circumferentially-spaced outlet guide vanes 142. As such, the fan casing 140 may enclose the fan rotor 138 band its corresponding fan rotor blades 144. Moreover, a downstream section 146 of the fan casing 140 may extend over an outer portion of the core engine 114 so as to define a secondary, or by-pass, airflow conduit 148 that provides additional propulsive jet thrust.

During operation of the engine 100, it should be appreciated that an initial air flow (indicated by arrow 150) may enter the engine 100 through an associated inlet 152 of the fan casing 140. The air flow 150 then passes through the fan blades 144 and splits into a first compressed air flow (indicated by arrow 154) that moves through conduit 148 and a second compressed air flow (indicated by arrow 156) which enters the booster compressor 122. The pressure of the second compressed air flow 156 is then increased and enters the high-pressure compressor 124 (as indicated by arrow 158). After mixing with fuel and being combusted within the combustor 126, the combustion products 160 exit the combustor 126 and flow through the first turbine 128. Thereafter, the combustion products 160 flow through the second turbine 132 and exit the exhaust nozzle 136 to provide thrust for the engine 100.

Figure 9:
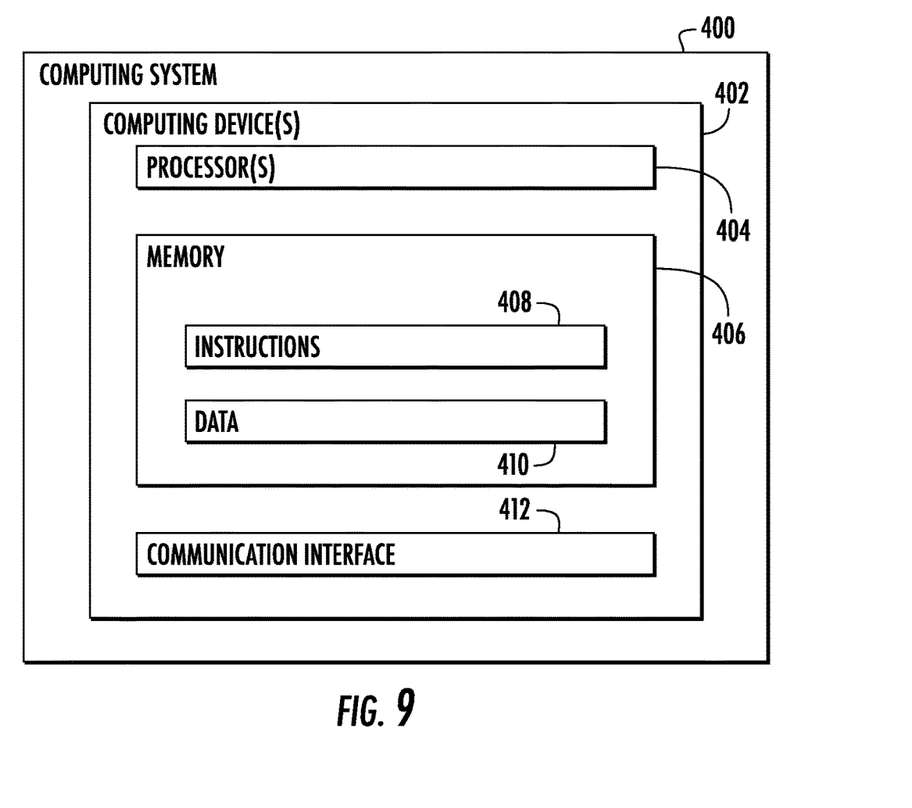
FIG. 9 depicts an exemplary controller such as for use in implementing the method of FIG. 8 according to the present disclosure.

FIG. 9 provides a block diagram of an example computing system 400 that is representative of a computing device for implementing the exemplary method 500 described herein according to exemplary embodiments of the present subject matter. As shown, the computing system 400 may include one or more computing device(s) 402. The one or more computing device(s) 402 may include one or more processor (s) 404 and one or more memory device(s) 406. The one or more processor(s) 404 may include any suitable processing device, such as a microprocessor, microcontroller, integrated circuit, logic device, or other suitable processing device. The one or more memory device(s) 406 may include one or more computer-readable media, including, but not limited to, non-transitory computer-readable media, RAM, ROM, hard drives, flash drives, or other memory devices.

The one or more memory device(s) 406 may store information accessible by the one or more processor(s) 404, including computer-readable instructions 408 that may be executed by the one or more processor(s) 404. The instructions 408 may be any set of instructions that when executed by the one or more processor(s) 404, cause the one or more processor(s) 404 to perform operations. The instructions 408 may be software written in any suitable programming language or may be implemented in hardware. In some embodiments, the instructions 408 may be executed by the one or more processor(s) 404 to cause the one or more processor(s) 404 to perform the processes for reducing the misalignment of planet gears mounted on a planet-carrier in an epicyclic gearing, or for implementing any of the other processes described herein.

The memory device(s) 404 may further store data 410 that may be accessed by the processor(s) 404. For example, the data 410 may include the number of gears pairs to be supported, dissipated loads, volume limitations, manufacturing processes, or material properties as described herein. The data 410 may include one or more table(s), function(s), algorithm(s), model(s), equation(s), etc. according to example embodiments of the present subject matter.

The one or more computing device(s) 402 may also include a communication interface 412 used to communicate, for example, with the other components of system. The communication interface 412 may include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A planet-carrier for an epicyclic gearing defining a transmission axis, the carrier comprising: a side plate comprising a coupling portion for connecting the side plate to a rotating member or to a static structure; a central ring coaxial to the side plate along the transmission axis; a plurality of planet pins coupled to the central ring; and a plurality of support pylons comprising a first support pylon, the first support pylon having a first pylon end coupled to the side plate and a second pylon end coupled to the central ring, the first support pylon further comprising: a pillar defining a pillar stiffness, and a stiffness-reducing feature defining a feature stiffness, the stiffness-reducing feature and the pillar being arranged along the first support pylon, wherein the feature stiffness is less than the pillar stiffness.

2. The carrier of any preceding clause wherein the side plate has a side-plate stiffness, wherein the side-plate stiffness is 10% or more greater than the pillar stiffness.

3. The carrier of any preceding clause wherein the first support pylon defines a pylon axis passing through the first pylon end and the second pylon end, wherein the pylon axis forms an angle with the side plate which is less than 90° and greater than 20°.

4. The carrier of any preceding clause wherein the pillar has a pillar cross-sectional area and the stiffness-reducing feature has a feature cross-sectional area, and wherein the feature cross-sectional area is less than the pillar cross-sectional area.

5. The carrier of any preceding clause wherein the stiffness-reducing feature is a first stiffness-reducing feature, the first support pylon further comprising a second stiffness-reducing feature, wherein the first and second stiffness-reducing features are positioned at the first and second ends of the first support pylon, wherein the feature cross-sectional area is a first feature cross-sectional area and the second stiffness-reducing feature has a second feature cross-sectional area, the second feature cross-sectional area is less than the pillar cross-sectional area.

6. The carrier of any preceding clause wherein the central ring further comprises a first face and a second face opposite thereof and oriented toward the side plate, the second face defines a plane, the first support pylon extends past the plane to at least partially define a recess in the second face.

7. The carrier of any preceding clause wherein each of the stiffness-reducing features comprises a lattice structure.

8. The carrier of any preceding clause wherein the pylon axis forms an angle with the side plate which is less than or equal to 85° and greater than or equal to 75°.

9. The carrier of any preceding clause wherein the pylon axis forms an angle with the side plate which is less than 75° and greater than or equal to 60°.

10. The carrier of any preceding clause wherein the epicyclic gearing further comprises: a plurality of planet gears mounted so as to rotate on the plurality of planet pins and define two symmetric arrays with respect to a plane lying orthogonal to the transmission axis; a ring gear having at least one inner toothing that meshes with the planet gears; and at least one sun gear that is rotatable about the transmission axis and meshes with the planet gears.

11. The carrier of any preceding clause wherein the carrier is formed as a unitary body.

12. The carrier of any preceding clause wherein the carrier further comprises: a plurality of stiffening elements coupled to at least one of the side plate, the central ring, and the pillar, such that the resultant side-plate stiffness is significantly greater than the resultant pillar stiffness, which is greater than the feature stiffness.

13. The carrier of any preceding clause wherein the central ring comprises a single segment formed integrally without any seams or joints and wherein the side plate comprises a single segment formed integrally without any seams or joints.

14. The carrier of any preceding clause wherein the plurality of planet pins protrude in opposite directions from the central ring along respective axes, parallel and eccentric with respect to the transmission axis, wherein each of the planet pins are configured to carry respective planet gears, wherein the plurality of planet pins comprise five pairs of planet pins configured to carry five pairs of planet gears.

15. The carrier of any preceding clause wherein the plurality of planet pins protrude in opposite directions from the central ring along respective axes, parallel and eccentric with respect to the transmission axis, wherein each of the planet pins are configured to carry respective planet gears, wherein the plurality of planet pins comprise seven pairs of planet pins configured to carry seven pairs of planet gears.

16. A gas turbine engine comprising: an epicyclic gearing, the epicyclic gearing having a planet-carrier comprising: a side plate comprising a coupling portion for connecting the side plate to a rotating member or to a static structure, a central ring coaxial to the side plate along the transmission axis, a plurality of planet pins coupled to the central ring, wherein the plurality of planet pins protrude in opposite directions from the central ring along respective axes, parallel and eccentric with respect to the transmission axis, wherein each of the planet pins are configured to carry respective planet gears, wherein the plurality of planet pins comprise more than three and less than or equal to nine pairs of planet pins configured to carry more than three and less than or equal to nine pairs of planet gears, and a plurality of support pylons comprising a first support pylon, the first support pylon having a first pylon end coupled to the side plate and a second pylon end coupled to the central ring, the first support pylon further comprising: a pillar defining a pillar stiffness, and a stiffness-reducing feature defining a feature stiffness, the stiffness-reducing feature and the pillar being arranged along the first support pylon, wherein the feature stiffness is less than the pillar stiffness.

17. The gas turbine engine of any preceding clause wherein the first support pylon defines a pylon axis passing through the first pylon end and the second pylon end, the pylon axis forms an angle with the side plate which is less than 90° and greater than 20°, the side plate defines a side-plate stiffness, and the side-plate stiffness is 10% greater than the pillar stiffness.

18. The gas turbine engine of any preceding clause wherein the pillar has a pillar cross-sectional area and the stiffness-reducing feature has a feature cross-sectional area, and wherein the feature cross sectional area is less than the pillar cross-sectional area.

19. A method for reducing planet gear misalignment of planet gears mounted on a planet-carrier in an epicyclic gearing, wherein the carrier includes a side plate, a central ring, a plurality of planet pins, and a plurality of support pylons comprising a pillar and a stiffness-reducing feature, the method comprising; determining a feature stiffness for the stiffness-reducing feature; determining a pillar stiffness for the pillar, wherein the pillar stiffness is greater than the feature stiffness; determining a side-plate stiffness for the side plate, wherein the side-plate stiffness is 10% or more greater than the pillar stiffness, which is greater than the feature stiffness; establishing an angle between a pylon axis and the side plate which is less than 90° and greater than 20°.

20. The method of any preceding clause wherein the method further comprises: forming the planet-carrier comprising a unitary body wherein the side-plate stiffness is 10% or more greater than the pillar stiffness and the pillar stiffness is greater than the feature stiffness, and wherein the pylon axis forms an angle which is less than 90° and greater than 20° with the side plate.

What is claimed is:

1. A planet-carrier for an epicyclic gearing defining a transmission axis, the planet-carrier comprising:
    a side plate comprising a coupling portion for connecting the side plate to a rotating member or to a static structure;
    a central ring coaxial to the side plate along the transmission axis;
    a plurality of planet pins coupled to the central ring; and
    a plurality of support pylons comprising a first support pylon, the first support pylon having a first pylon end coupled to the side plate and a second pylon end coupled to the central ring, the first support pylon further comprising:
        a pillar defining a pillar stiffness, and
        a stiffness-reducing feature defining a feature stiffness, the stiffness-reducing feature and the pillar being arranged along the first support pylon, wherein the feature stiffness is less than the pillar stiffness,
    wherein the first support pylon defines a pylon axis passing through the first pylon end and the second pylon end, wherein the pylon axis forms an angle with the side plate which is less than 90° and greater than 20°.

2. The planet-carrier of claim 1, wherein the side plate has a side-plate stiffness, wherein the side-plate stiffness is 10% or more greater than the pillar stiffness.

3. The planet-carrier of claim 1, wherein the pillar has a pillar cross-sectional area and the stiffness-reducing feature has a feature cross-sectional area, and wherein the feature cross-sectional area is less than the pillar cross-sectional area.

4. The planet-carrier of claim 3, wherein the stiffness-reducing feature is a first stiffness-reducing feature, the first support pylon further comprising a second stiffness-reducing feature, wherein the first and second stiffness-reducing features are positioned at the first pylon end and the second pylon end of the first support pylon, wherein the feature cross-sectional area is a first feature cross-sectional area and the second stiffness-reducing feature has a second feature cross-sectional area, the second feature cross-sectional area is less than the pillar cross-sectional area.

5. The planet-carrier of claim 1, wherein the central ring further comprises a first face and a second face opposite thereof and oriented toward the side plate, the second face defines a plane, the first support pylon extends past the plane to at least partially define a recess in the second face.

6. The planet-carrier of claim 1, wherein the angle is less than or equal to 85° and greater than or equal to 75°.

7. The planet-carrier of claim 1, wherein the angle is less than 75° and greater than or equal to 60°.

8. The planet-carrier of claim 1, wherein the epicyclic gearing further comprises:
a plurality of planet gears mounted so as to rotate on the plurality of planet pins and define two symmetric arrays with respect to a plane lying orthogonal to the transmission axis;
a ring gear having at least one inner toothing that meshes with the planet gears; and
at least one sun gear that is rotatable about the transmission axis and meshes with the planet gears.

9. The planet-carrier of claim 1, wherein the planet-carrier is formed as a unitary body.

10. The planet-carrier of claim 1, wherein the central ring comprises a single segment formed integrally without any seams or joints and wherein the side plate comprises a single segment formed integrally without any seams or joints.

11. The planet-carrier of claim 1, wherein the plurality of planet pins protrude in opposite directions from the central ring along respective axes, parallel with respect to the transmission axis, wherein each of the planet pins are configured to carry respective planet gears, wherein the plurality of planet pins comprise five pairs of planet pins configured to carry five pairs of planet gears, respectively.

12. The planet-carrier of claim 1 wherein the plurality of planet pins protrude in opposite directions from the central ring along respective axes, parallel with respect to the transmission axis, wherein each of the planet pins are configured to carry respective planet gears, wherein the plurality of planet pins comprise seven pairs of planet pins configured to carry seven pairs of planet gears, respectively.

13. A gas turbine engine comprising:
an epicyclic gearing, the epicyclic gearing having a planet-carrier comprising:
a side plate comprising a coupling portion for connecting the side plate to a rotating member or to a static structure,
a central ring coaxial to the side plate along a transmission axis,
a plurality of planet pins coupled to the central ring, wherein the plurality of planet pins protrude in opposite directions from the central ring along respective axes, parallel with respect to the transmission axis, wherein each of the planet pins are configured to carry respective planet gears, wherein the plurality of planet pins comprise more than three and less than or equal to nine pairs of planet pins configured to carry more than three and less than or equal to nine pairs of planet gears, respectively, and
a plurality of support pylons comprising a first support pylon, the first support pylon having a first pylon end coupled to the side plate and a second pylon end coupled to the central ring, the first support pylon further comprising:
a pillar defining a pillar stiffness, and
a stiffness-reducing feature defining a feature stiffness, the stiffness-reducing feature and the pillar being arranged along the first support pylon, wherein the feature stiffness is less than the pillar stiffness.

14. The gas turbine engine of claim 13, wherein:
the first support pylon defines a pylon axis passing through the first pylon end and the second pylon end,
the pylon axis forms an angle with the side plate which is less than 90° and greater than 20°,
the side plate defines a side-plate stiffness, and
the side-plate stiffness is 10% greater than the pillar stiffness.

15. The gas turbine engine of claim 14, wherein the pillar has a pillar cross-sectional area and the stiffness-reducing feature has a feature cross-sectional area, and wherein the feature cross-sectional area is less than the pillar cross-sectional area.

16. A method for reducing planet gear misalignment of planet gears mounted on a planet-carrier in an epicyclic gearing, wherein the planet-carrier includes a side plate, a central ring, a plurality of planet pins, and a plurality of support pylons comprising a pillar and a stiffness-reducing feature, the method comprising;
determining a feature stiffness for the stiffness-reducing feature;
determining a pillar stiffness for the pillar, wherein the pillar stiffness is greater than the feature stiffness;
determining a side-plate stiffness for the side plate, wherein the side-plate stiffness is 10% or more greater than the pillar stiffness, which is greater than the feature stiffness; and
establishing an angle between a pylon axis and the side plate which is less than 90° and greater than 20°.

17. The method of claim 16, wherein the method further comprises:
forming the planet-carrier comprising a unitary body wherein the side-plate stiffness is 10% or more greater than the pillar stiffness and the pillar stiffness is greater than the feature stiffness.

* * * * *